(12) United States Patent
Ford

(10) Patent No.: US 6,403,928 B1
(45) Date of Patent: Jun. 11, 2002

(54) BEVERAGE HEATING ASSEMBLY

(76) Inventor: Tracy L. Ford, P.O. Box 1171, Poway, CA (US) 92074

( * ) Notice: Subject to any disclaimer, the term of this patent is extended or adjusted under 35 U.S.C. 154(b) by 0 days.

(21) Appl. No.: 09/860,326

(22) Filed: May 18, 2001

(51) Int. Cl.$^7$ .............................. A47J 36/24; F27D 11/02
(52) U.S. Cl. .................. 219/432; 219/433; 219/386
(58) Field of Search ............................. 219/432, 433, 219/429, 386

(56) References Cited

U.S. PATENT DOCUMENTS

| | | | |
|---|---|---|---|
| 2,843,719 A | * 7/1958 | Smith et al. | 219/429 |
| 3,432,641 A | * 3/1969 | Welke | 219/433 |
| 4,160,152 A | * 7/1979 | Wightman et al. | 219/433 |
| D259,168 S | 5/1981 | Petrie | |
| 4,305,533 A | 12/1981 | Wightman et al. | |
| 4,442,343 A | * 4/1984 | Genuit et al. | 392/444 |
| 4,463,664 A | * 8/1984 | Peace | 219/433 |
| 4,523,083 A | 6/1985 | Hamilton | |
| 4,959,528 A | * 9/1990 | Malloy | 219/432 |
| 5,019,691 A | * 5/1991 | Lai | 219/432 |
| 5,283,420 A | 2/1994 | Montalto | |
| 5,700,991 A | * 12/1997 | Osbern | 219/432 |
| 6,072,161 A | 6/2000 | Stein | |
| 6,075,229 A | 6/2000 | Vanselow | |
| 6,100,504 A | * 8/2000 | Wagner | 219/432 |

FOREIGN PATENT DOCUMENTS

EP 26756 * 4/1981

* cited by examiner

Primary Examiner—Joseph Pelham

(57) ABSTRACT

A beverage heating assembly for warming and maintaining the temperature of a hot beverage. The beverage heating assembly includes an housing with a base portion designed for resting on a horizontal support surface such as a desk or a vehicle dash board, a heating element positioned substantially within the housing for converting electrical energy to thermal energy for heating a beverage in a cup, and an electrical power source operationally coupled to the heating element for providing electrical energy to the heating element.

5 Claims, 2 Drawing Sheets

BEVERAGE HEATING ASSEMBLY

BACKGROUND OF THE INVENTION

1. Field of the Invention

The present invention relates to beverage warmers and more particularly pertains to a new beverage heating assembly for warming and maintaining the temperature of a hot beverage.

2. Description of the Prior Art

The use of beverage warmers is known in the prior art. More specifically, beverage warmers heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 6,072,161; U.S. Pat. No. 6,075,229; U.S. Pat. No. 4,523,083; U.S. Pat. No. 4,305,533; U.S. Pat. No. 5,283,420; and U.S. Pat. No. Des. 259,168.

While these devices fulfill their respective, particular objectives and requirements, the aforementioned patents do not disclose a new beverage heating assembly. The inventive device includes an housing with a base portion designed for resting on a horizontal support surface such as a desk or a vehicle dash board, a heating element positioned substantially within the housing for converting electrical energy to thermal energy for heating a beverage in a cup, and an electrical power source operationally coupled to the heating element for providing electrical energy to the heating element.

In these respects, the beverage heating assembly according to the present invention substantially departs from the conventional concepts and designs of the prior art, and in so doing provides an apparatus primarily developed for the purpose of warming and maintaining the temperature of a hot beverage.

SUMMARY OF THE INVENTION

In view of the foregoing disadvantages inherent in the known types of beverage warmers now present in the prior art, the present invention provides a new beverage heating assembly construction wherein the same can be utilized for warming and maintaining the temperature of a hot beverage.

The general purpose of the present invention, which will be described subsequently in greater detail, is to provide a new beverage heating assembly apparatus and method which has many of the advantages of the beverage warmers mentioned heretofore and many novel features that result in a new beverage heating assembly which is not anticipated, rendered obvious, suggested, or even implied by any of the prior art beverage warmers, either alone or in any combination thereof.

To attain this, the present invention generally comprises an housing with a base portion designed for resting on a horizontal support surface such as a desk or a vehicle dash board, a heating element positioned substantially within the housing for converting electrical energy to thermal energy for heating a beverage in a cup, and an electrical power source operationally coupled to the heating element for providing electrical energy to the heating element.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent. constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new beverage heating assembly apparatus and method which has many of the advantages of the beverage warmers mentioned heretofore and many novel features that result in a new beverage heating assembly which is not anticipated, rendered obvious, suggested, or even implied by any of the prior art beverage warmers, either alone or in any combination thereof.

It is another object of the present invention to provide a new beverage heating assembly which may be easily and efficiently manufactured and marketed.

It is a further object of the present invention to provide a new beverage heating assembly which is of a durable and reliable construction.

An even further object of the present invention is to provide a new beverage heating assembly which is susceptible of a low cost of manufacture with regard to both materials and labor, and which accordingly is then susceptible of low prices of sale to the consuming public, thereby making such beverage heating assembly economically available to the buying public.

Still yet another object of the present invention is to provide a new beverage heating assembly which provides in the apparatuses and methods of the prior art some of the advantages thereof, while simultaneously overcoming some of the disadvantages normally associated therewith.

Still another object of the present invention is to provide a new beverage heating assembly for warming and maintaining the temperature of a hot beverage.

Yet another object of the present invention is to provide a new beverage heating assembly which includes an housing with a base portion designed for resting on a horizontal support surface such as a desk or a vehicle dash board, a heating element positioned substantially within the housing for converting electrical energy to thermal energy for heating a beverage in a cup, and an electrical power source operationally coupled to the heating element for providing electrical energy to the heating element.

Still yet another object of the present invention is to provide a new beverage heating assembly that is highly portable.

Even still another object of the present invention is to provide a new beverage heating assembly that comes in a variety of colors to coordinate or accent interiors.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
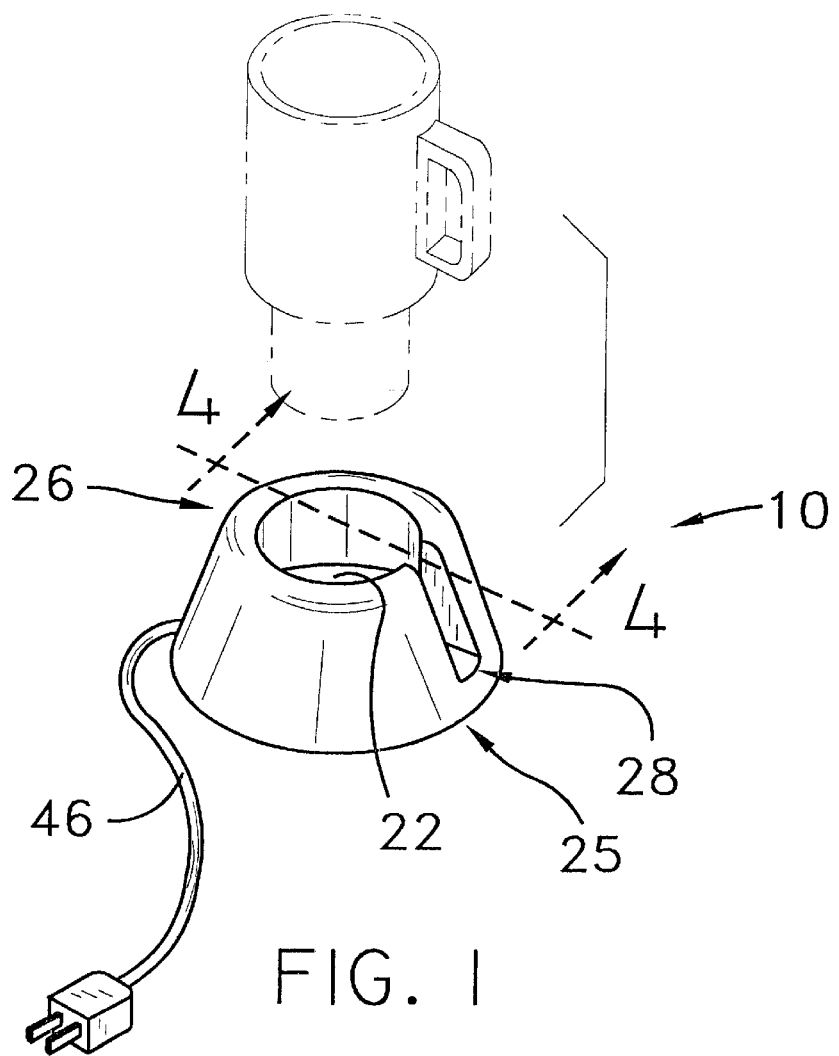
FIG. 1 is a schematic perspective view of a new beverage heating assembly according to the present invention.
Figure 2:
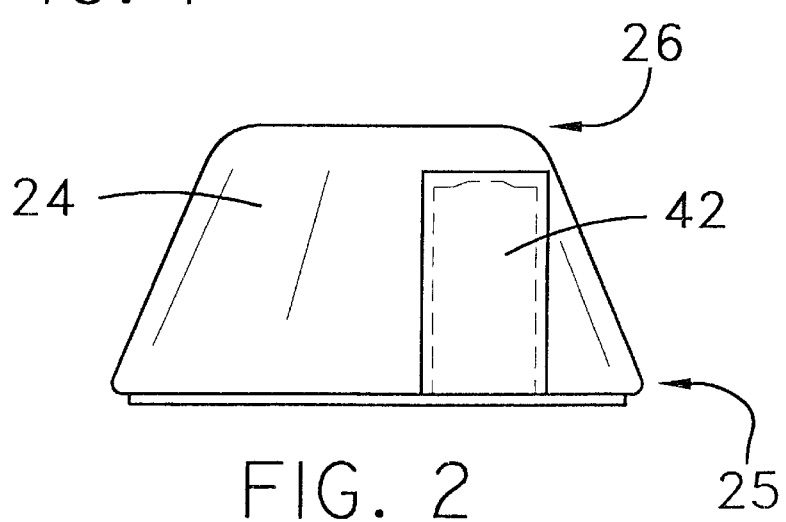
FIG. 2 is a schematic side view of the present invention.
Figure 3:
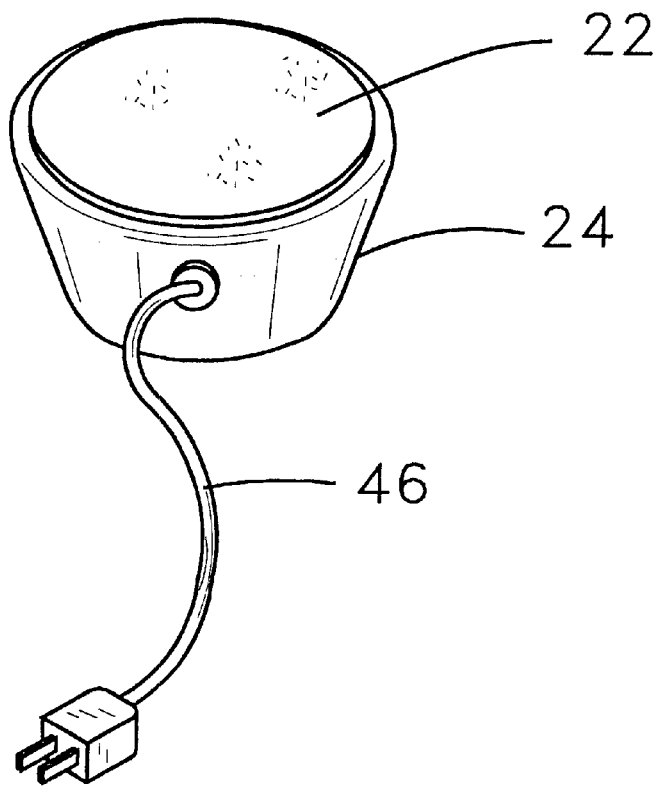
FIG. 3 is a schematic bottom view of the present invention.
Figure 4:
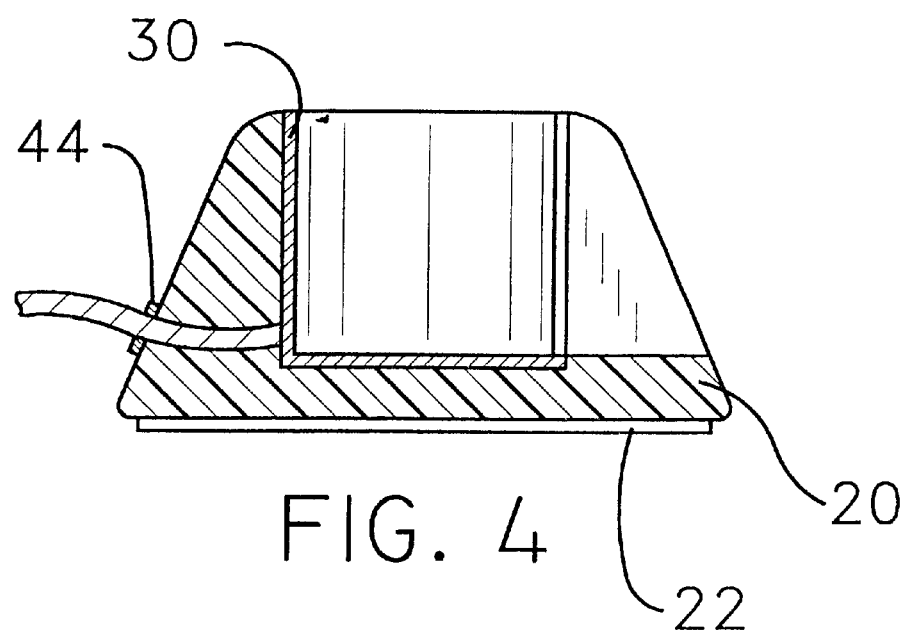
FIG. 4 is a schematic cross-sectional view of the present invention.

With reference now to the drawings, and in particular to FIGS. 1 through 4 thereof, a new beverage heating assembly embodying the principles and concepts of the present invention and generally designated by the reference numeral 10 will be described.

As best illustrated in FIGS. 1 through 4, the beverage heating assembly 10 generally comprises an housing 20, an heating element 30, and an electrical power source 40.

The housing 20 includes a base portion 22 designed for resting on a horizontal support surface such as a desk or a vehicle dash board.

The heating element 30 is positioned substantially within the housing 20. The heating element 30 is for converting electrical energy to thermal energy for heating a beverage in a cup.

The electrical power source 40 is operationally coupled to the heating element 30. The electrical power source 40 provides electrical energy to the heating element 30.

The housing 20 further comprises a perimeter wall 24, which extends upwardly from the base portion 22. The perimeter wall 24 is designed for substantially encompassing an exterior surface of a cup for preventing the cup from sliding off the housing 20.

The perimeter wall 24 further comprises a slot 28, which extends from the base portion 22 upwardly through the perimeter wall 24. The slot 28 is designed for receiving a handle of a cup.

The perimeter wall 24 has a first circumference 25 adjacent to the base portion 22. The perimeter wall 24 also includes a second circumference 26 positioned distal from the base portion 22. The perimeter wall 24 tapers inwardly as the perimeter wall 24 extends upwardly from the base portion 22 such that the first circumference 25 is substantially larger than the second circumference 26.

In an embodiment, the electrical power source 40 comprises at least one battery 42 positioned within the housing 20.

In a further embodiment, the electrical power source 40 comprises a power input jack 44 and an electrical cord 46. The power input jack 44 is positioned substantially within the housing 20. The electrical cord 46 is designed for connecting to a conventional power source. The electrical cord 46 provides electrical current from the conventional power source to the power input jack 44.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A beverage heating assembly for use with conventional mugs and cups comprising:

an housing having a base portion adapted for resting on a horizontal support surface such as a desk or a vehicle dash board;

a heating element positioned substantially within said housing, said heating element being for converting electrical energy to thermal energy for heating a beverage in a cup;

an electrical power source operationally coupled to said heating element, said electrical power source providing electrical energy to said heating element;

said housing further comprises a perimeter wall extending upwardly from said base portion, said perimeter wall being adapted for substantially encompassing an exterior surface of a cup for preventing the cup from sliding off said housing; and said perimeter wall further comprises a slot extending from said from said base portion upwardly through said perimeter wall, said slot being adapted for receiving a handle of a cup.

2. The beverage heating assembly of claim 1, wherein said perimeter wall has a first circumference adjacent to said base portion, said perimeter wall having a second circumference positioned distal from said base portion, said perimeter wall tapering inwardly as said perimeter wall extends upwardly from said base portion such that said first circumference is substantially larger than said second circumference.

3. A beverage heating assembly for use with conventional mugs and cups comprising:

an housing having a base portion adapted for resting on a horizontal support surface such as a desk or a vehicle dash board;

a heating element positioned substantially within said housing, said heating element being for converting electrical energy to thermal energy for heating a beverage in a cup;

an electrical power source operationally coupled to said heating element, said electrical power source providing electrical energy to said heating element;

said housing further comprises a perimeter wall extending upwardly from said base portion, said perimeter wall being adapted for substantially encompassing an exterior surface of a cup for preventing the cup from sliding off said housing;

said perimeter wall further comprises a slot extending from said from said base portion upwardly through said perimeter wall, said slot being adapted for receiving a handle of a cup;

said perimeter wall has a first circumference adjacent to said base portion, said perimeter wall having a second circumference positioned distal from said base portion, said perimeter wall tapering inwardly as said perimeter wall extends upwardly from said base portion such that said first circumference is substantially larger than said second circumference.

4. The beverage heating assembly of claim 3, wherein said electrical power source comprises at least one battery positioned within said housing.

5. The beverage heating assembly of claim 3, wherein said electrical power source comprises:

a power input jack positioned substantially within said housing;

an electrical cord adapted for connecting to a conventional power source, said electrical cord providing electrical current from said conventional power source to said power input jack.

* * * * *